United States Patent Office 3,828,032
Patented Aug. 6, 1974

3,828,032
PROCESS FOR PREPARING 3-ALKYL-2-BENZO-THIAZOLINYLIDENE KETONES
Richard S. Henion, Brockport, and Cataldo A. Maggiulli, Pittsford, N.Y., assignors to Eastman Kodak Company, Rochester, N.Y.
No Drawing. Filed June 9, 1971, Ser. No. 151,513
Int. Cl. C07d 91/44
U.S. Cl. 260—240 R           9 Claims

ABSTRACT OF THE DISCLOSURE

The benzothiazolinylidene ketones are prepared by condensing a benzothiazolium quaternary salt such as 3-methylbenzothiazolium methyl sulfate with an α-halo-ketone such as 1-chloro-2-propanone in the presence of a strong organic base. Generally, higher yields are obtained compared to the prior use of acid halides instead of α-haloketones in the reaction.

---

This invention relates to the preparation of benzothiazole derivatives particularly useful as intermediates for the preparation of photographic sensitizing dyes.

The benzothiazole derivatives are 3-alkyl-2-benzothiazolinylidene ketones having the general formula

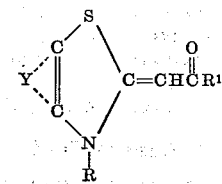

wherein R, R¹ and Y are described below.

These compounds have previously been prepared by condensation of quaternized benzothiazoles with acid halides in the presence of strong organc base; for example, as described in Brooker et al. U.S. Pat. 2,341,357.

We have discovered a process for preparing the 3-alkyl-2-benzothiazolinylidene ketones which involves condensation of a benzothiazolium quaternary salt with an α-haloketone, e.g. the ketones, R¹COCH₂Cl, R¹COCH₂Br or R¹COCH₂I in the presence of strong organic base. The analogous fluoro compounds are less preferred. The process generally produces considerably higher yields than obtainable by the processes using acid halides such as that of U.S. Pat. 2,341,357.

The process of this invention is distinctive in that it appears to involve the formation of a carbanion by loss of a proton from the carbon atom in the 2-position of the benzothiazole nucleus, followed by substitution of the chloride ion of the ketone by the carbanion followed by loss of hydrogen halide to form the desired 3-alkyl-2-benzothiazolinylidene ketone. While in some cases the process gives yields of about 60–70% theoretical, similar to the process of U.S. 2,341,357, in many cases yields as high as about 97% are obtainable. Unexpectedly, the analogous benzoxazolium and benzimidazolium quaternary salts were not found to react with the α-haloketones to produce the desired azolinylidene ketones.

The process of the invention particularly includes condensation of benzothiazoles having the general formula

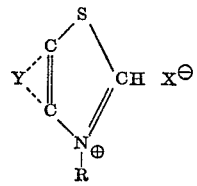

with an α-chloroketone having the general formula R¹COCH₂Cl wherein R represents a lower alkyl group having 1 to 4 carbon atoms such as methyl, ethyl, n-propyl and n-butyl, R¹ represents lower alkyl as above, or a monocyclic arylene group of the benzene series, e.g. phenyl, o-tolyl, o-nitrophenyl, m-chlorophenyl, etc., X represents an acid anion such as p-toluene sulfonate, methylsulfate, etc., Y represents the atoms necessary to complete a monocyclic arylene group of the benzene series corresponding to the aromatic nucleus of the benzothiazolium salt used in the synthesis, e.g. benzothiazolium, 6-chlorobenzothiazolium, 5,6-dichlorobenzothiazolium, 5-sulfonamidobenzothiazolium, 5-lower alkylbenzothiazolium such as 5-methylbenzothiazolium, 5-nitrobenzothiazolium, 5-phenylbenzothiazolium and 5-carbomethoxybenzothiazolium salts.

Representative α-haloketones of formulas R1COCH₂Cl, R¹COCH₂Br or R¹COCH₂I useful in the reaction are 1-chloro-2-propanone, 1-bromo-2-propanone, 1-chloro-2-butanone, 1-bromo-2-hexanone, 2-chloroacetophenone, 2-bromoacetophenone, 2-chloromethyl - o - tolylketone, 2-chloromethyl-2,4-dimethylphenyl ketone, 2-chloromethyl-o-nitrophenyl ketone, iodoacetone, etc. In this reaction, a small excess of the ketone is used, e.g. about 10% excess.

In carrying out the reaction, it is desirable to apply moderate heat below the boiling point of the particular organic solvent used since the reaction proceeds slowly at room temperature. The solvent used is not critical but should be one effectively contacting the reactants, e.g. lower alcohols, dioxane, acetone, tetrahydrofuran and aromatic hydrocarbons such as benzene and toluene.

The strong organic bases used in the reaction include tertiary amines such as lower trialkylamines, pyridine, picolines and quinolines.

The following examples will serve to illustrate the invention.

EXAMPLE 1

1-(3-methyl-2-benzothiazolinylidene)-2-propanone

A solution of 1-chloro-2-propanone (10 g., 0.108 mole) in methanol (50 ml.) is added at a rapid drop rate to a solution of 3-methylbenzothiazolium methyl sulfate (23 g., 0.088 mole) and triethylamine (25 ml.) in methanol (100 ml.). After the addition is complete, the reaction is heated to 60° C. for 10 minutes, then drowned by pouring it into water. The solid which forms is removed by filtration and dried. A brownish-red solid weighing 12 g. is obtained, which is 68.5% of the theoretical 18 g. After recrystallization, a sample melts at 130–132° C.

An N.M.R. spectrum in CHCl₃ shows a singlet (3H) at 2.18δ for the acetyl methyl group, a singlet (3H) at 3.13δ for the N-methyl group, and a multiplet (5H) between 6.1δ and 7.7δ for the vinylic hydrogen and the four aromatic hydrogens, all relative to tetramethylsilane.

| Analysis; C₁₁H₁₁NOS: | Calculated | Found |
|---|---|---|
| C | 64.4 | 64.3 |
| H | 5.4 | 5.4 |
| N | 6.8 | 6.9 |
| S | 15.6 | 16 |

EXAMPLE 2

2-(3-methyl-2-benzothiazolinylidene)acetophenone

A solution of 2-chloroacetophenone (15.5 g., 0.1 mole) in methanol (100 ml.) is added at a rapid drop rate to 3-methylbenzothiazolium methylsulfate (20 g., 0.0767 mole) and triethylamine (25 ml.) in methanol (100 ml.). After the addition is complete, the reaction is warmed to 60° C. for 0.5 hour, then poured into 1 liter of cold water. The solid which separates is removed by filtration and dried. The product weighs 20 g., which represents 97% of the theoretical 20.5 g. A sample recrystallized from isopropyl alcohol melts at 164.5° C.

An N.M.R. spectrum of the compound in $CHCl_3$ shows a singlet at 3.1δ (3H) for the N-methyl group and a multiplet between 6.4δ and 8.0δ (10H) for all of the aromatic hydrogen (9) and the vinylic hydrogen, all relative to tetramethylsilane.

| Analysis; $C_{16}H_{13}NOS$: | Calculated | Found |
|---|---|---|
| C | 72.0 | 71.9 |
| H | 4.9 | 4.9 |
| N | 5.2 | 5.1 |
| S | 11.9 | 12.1 |

The other benzothiazolium salts and α-haloketones are reacted as in Examples 1 and 2 to produce the corresponding 3-alkyl-2-benzothiazolinylidene ketones.

The invention has been described in detail with particular reference to a preferred embodiment thereof, but it will be understood that variations and modifications can be effected within the spirit and scope of the invention.

What we claim is:

1. A process for preparing a 3-alkyl-2-benzothiazolinylidene ketone comprising condensing a benzothiazolium quaternary salt having the formula

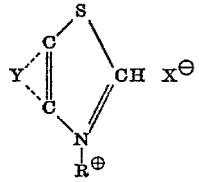

with an α-haloketone having the formula $R^1COCH_2Cl$, $R^1COCH_2Br$, or $R^1COCH_2I$ in the presence of a strong organic base, wherein R represents a lower alkyl group having 1 to 4 carbon atoms, $R^1$ represents a lower alkyl group having 1 to 4 carbon atoms or a monocyclic aryl group of the benzene series selected from the group consisting of phenyl, o-tolyl, o-nitrophenyl, or m-chlorophenyl;

X represents an acid anion and

Y represents the non-metallic atoms necessary to complete a monocyclic arylene group of the benzene series corresponding to the aromatic nucleus of a benzothiazolium salt selected from the group consisting of benzothiazolium, 6 - chlorobenzothiazolium, 5,6 - dichlorobenzothiazolium, 5-sulfonamidobenzothiazolium, 5-lower alkylbenzothiazolium, 5-nitrobenzothiazolium, 5-phenylbenzothiazolium and 5-carbomethoxybenzothiazolium salts.

2. The process according to claim 1 wherein the organic base is a lower tertiary aliphatic amine.

3. The process according to claim 1 wherein the α-haloketone has the general formula $R^1COCH_2Cl$.

4. A process in accordance with claim 1 wherein $R^1$ represents phenyl, o-tolyl, o-nitrophenyl, or m-chlorophenyl.

5. A process in accordance with claim 1 wherein $R^1$ represents a lower alkyl group having 1 to 4 carbon atoms.

6. A process in accordance with claim 5 wherein the organic base is a tertiary amine.

7. A process in accordance with claim 6 wherein the organic base is a lower trialkylamine, pyridine, a picoline or a quinoline.

8. A process for preparing 1-(3-methyl-2-benzothiazolinylidene)-2-propanone which comprises condensing 3-methylbenzothiazolium methyl sulfate with 1-chloro-2-propanone in the presence of triethylamine.

9. A process for preparing 2-(3-methyl-2-benzothiazolinylidene)acetophenone which comprises condensing 3-methylbenzothiazolium methyl sulfate with 2-chloroacetophenone in the presence of triethylamine.

References Cited

UNITED STATES PATENTS 2,112,139  3/1938  Brooker et al. _____ 260—304

RICHARD J. GALLAGHER, Primary Examiner

U.S. Cl. X.R.

260—240 J, 304

Disclaimer 3,828,032.—*Richard S. Henion*, Brockport and *Cataldo A. Maggiulli*, Pittsford, N.Y. PROCESS FOR PREPARING 3-ALKYL-2-BENZOTHIAZOLINYLIDENE KETONES. Patent dated Aug. 6, 1974. Disclaimer filed Mar. 31, 1975, by the assignee, *Eastman Kodak Company*.

Hereby enters this disclaimer to claims 1 to 9, inclusive, of said patent.

[*Official Gazette June 24, 1975.*]